United States Patent
Cho et al.

(10) Patent No.: US 11,820,357 B2
(45) Date of Patent: Nov. 21, 2023

(54) VEHICLE AND METHOD OF CONTROLLING SPEED LIMIT FOR THE SAME

(71) Applicants: HYUNDAI MOTOR COMPANY, Seoul (KR); KIA CORPORATION, Seoul (KR)

(72) Inventors: Lee Hyoung Cho, Suwon-si (KR); Ji Won Oh, Hwaseong-si (KR); Sang Joon Kim, Seoul (KR); Seong Ik Park, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 290 days.

(21) Appl. No.: 17/399,303

(22) Filed: Aug. 11, 2021

(65) Prior Publication Data
US 2022/0055604 A1 Feb. 24, 2022

(30) Foreign Application Priority Data
Aug. 18, 2020 (KR) .......................... 10-2020-0103217

(51) Int. Cl.
  *B60W 20/10* (2016.01)
  *B60K 6/20* (2007.10)
  *B60L 15/20* (2006.01)

(52) U.S. Cl.
  CPC .............. *B60W 20/10* (2013.01); *B60K 6/20* (2013.01); *B60L 15/20* (2013.01); *B60L 2240/14* (2013.01); *B60L 2240/423* (2013.01); *B60L 2250/28* (2013.01); *B60L 2260/20* (2013.01); *B60L 2260/42* (2013.01);
  (Continued)

(58) Field of Classification Search
  CPC ............ B60W 20/10; B60W 2540/10; B60W 2710/0666; B60W 2710/083; B60W 2720/104; B60K 6/20; B60L 15/20; B60L 2240/14; B60L 2240/423; B60L 2260/42;
  (Continued)

(56) References Cited

U.S. PATENT DOCUMENTS

| | | | |
|---|---|---|---|
| 10,723,431 B1 * | 7/2020 | Przybyl | G01S 19/52 |
| 2009/0112417 A1 * | 4/2009 | Kaminsky | B60W 10/08 |
| | | | 701/55 |

(Continued)

OTHER PUBLICATIONS

Robert J. Telban and Frank M. Cardullo, Motion Cueing Algorithm Development: Human-Certified Linear and Nonlinear Approaches, Technical Report, State University of New York, 2005, 183 pp.

*Primary Examiner* — George C Jin
(74) *Attorney, Agent, or Firm* — LEMPIA SUMMERFIELD KATZ LLC (57) ABSTRACT

Disclosed are a vehicle for generating an acceleration profile based on the acceleration cognitive characteristics of the human and a method of controlling the same. The method includes: receiving a manipulation amount of an accelerator pedal and calculating a first torque value, inserting the first torque value to a function that receives force and outputs acceleration feeling, generating a second torque value by inserting an output value of the function into a first filter for stabilizing the output value, generating a target torque value by inputting the second torque value to a second filter for stabilizing the second torque value, and generating a torque command based on the target torque value.

19 Claims, 8 Drawing Sheets

(52) U.S. Cl.
CPC ...... *B60L 2260/44* (2013.01); *B60W 2540/10* (2013.01); *B60W 2710/0666* (2013.01); *B60W 2710/083* (2013.01); *B60W 2720/106* (2013.01); *B60Y 2200/91* (2013.01); *B60Y 2200/92* (2013.01); *B60Y 2300/182* (2013.01)

(58) Field of Classification Search
CPC ............ B60L 2260/44; B60Y 2200/91; B60Y 2200/92; B60Y 2300/182
See application file for complete search history.

(56) References Cited

U.S. PATENT DOCUMENTS

| | | | | |
|---|---|---|---|---|
| 2009/0118082 | A1* | 5/2009 | Heap | F16H 61/0437 180/65.21 |
| 2015/0203091 | A1* | 7/2015 | Wang | B60W 10/06 180/65.265 |
| 2022/0055604 | A1* | 2/2022 | Cho | B60L 15/20 |
| 2022/0306107 | A1* | 9/2022 | Ravichandran | B60W 10/11 |
| 2023/0134424 | A1* | 5/2023 | Oh | B60W 30/045 701/69 |

* cited by examiner

VEHICLE AND METHOD OF CONTROLLING SPEED LIMIT FOR THE SAME

CROSS-REFERENCE TO RELATED APPLICATIONS

This application claims priority to and the benefit of Korean Patent Application No. 10-2020-0103217, filed on Aug. 18, 2020, the entire contents of which are hereby incorporated by reference.

FIELD

The present disclosure relates to a vehicle for generating an acceleration profile based on the acceleration cognitive characteristics of humans and a method of controlling the same.

BACKGROUND

The statements in this section merely provide background information related to the present disclosure and may not constitute prior art.

Driver's satisfaction with driving performance of a vehicle is closely related to how rapidly the vehicle accelerates according to the driver's intention to accelerate the vehicle. However, a difference between acceleration of the vehicle and acceleration perceived by the driver may cause the driver to feel that the vehicle does not meet the intention to accelerate the vehicle even if the vehicle in fact accelerates in accordance with driver pedal manipulation.

Accordingly, research has been conducted into methods of generating acceleration of a vehicle based on human acceleration cognitive characteristics. In particular, it is known that change in acceleration (jerks) greatly affects human perception of acceleration.

Since acceleration feeling for perceiving acceleration is an individual's subjective sense, it is required to investigate acceleration feeling that people of various conditions such as age and gender experience. Conventionally, acceleration feeling is mainly investigated using a method of questioning people. Accordingly, it is difficult to objectively access survey content or answers, and even if the survey content or the answers are quantified, there is a limit to accurately represent the complex senses that humans experience.

Due to such limit, the magnitude and duration of acceleration are limited in many studies. However, we have discovered that when acceleration of a vehicle is controlled, a process of generating an acceleration profile more greatly affects acceleration feeling than the magnitude of acceleration.

SUMMARY

The present disclosure is directed to a vehicle for generating an acceleration profile based on the acceleration cognitive characteristics of humans and a method of controlling the same.

In particular, the present disclosure provides a vehicle and a method of controlling the same for generating an acceleration profile based on the characteristics of acceleration feeling perceived by a person by quantifying acceleration feeling for recognizing acceleration using a transfer function of the human response to force applied to the otolith of the human vestibular system.

The technical problems solved by the forms are not limited to the above technical problems and other technical problems which are not described herein will become apparent to those skilled in the art from the following description.

In one form of the present disclosure, a method of controlling a vehicle includes: receiving a manipulation amount of an accelerator pedal and calculating a first torque value; converting the first torque value into an output value representative of an acceleration feeling; generating a second torque value by applying a first filter to the converted output value; generating a target torque value by applying a second filter to the second torque value; and generating a torque command based on the target torque value.

In another aspect of the present disclosure, a vehicle includes: a controller for receiving a manipulation amount of an accelerator pedal and outputting a torque command depending on a target torque value; and an acceleration profile generator configured to: calculate a first torque value depending on the manipulation amount of an accelerator pedal, convert the first torque value into an output value representative of an acceleration feeling; generate a second torque value by applying a first filter to the converted output value, and generate the target torque value by applying a second filter to the second torque value, where the second filter stabilizes the second torque value.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, the exemplary forms of the present disclosure will be described in detail with reference to the accompanying drawings so as to be easily implemented by those skilled in the art. However, the present disclosure may be variously implemented, and is not limited to the forms described herein. In the drawings, in order to clearly describe the present disclosure, portions which are not related to the description of the present disclosure will be omitted, and similar portions are denoted by similar reference numerals throughout the specification.

Throughout the specification, when a certain portion is said to "include" a certain component, this does not indicate that other components are excluded, and the same may be further included unless specifically described to the contrary. The same reference numbers will be used throughout the drawings to refer to the same or like parts.

According to the exemplary forms, an acceleration profile may be generated based on the characteristics of acceleration feeling perceived by humans by quantifying acceleration feeling for recognizing acceleration using a neural transfer function of the otolith with respect to acceleration derived from research on a neural response of otoliths for recognizing longitudinal acceleration of the human vestibular system.

Prior to a description of a method of generating an acceleration profile according to an exemplary form of the present disclosure, the configuration and powertrain of a vehicle to which forms are applicable will be described. The forms of the present disclosure may be applied to various vehicles such as a general internal combustion engine vehicle, an electrified vehicle including an electric vehicle (EV) and a fuel cell electric vehicle (FCEV), and a hybrid vehicle. Hereinafter, the case in which an exemplary form of the present disclosure is applied to a hybrid vehicle among various vehicles will be exemplified.

Figure 1:
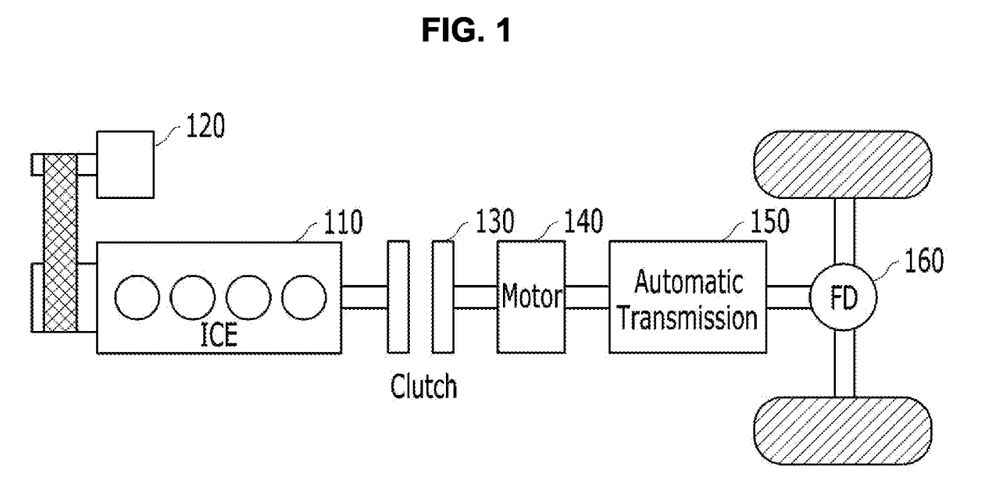
FIG. 1 is a diagram showing an example of the configuration of a powertrain of a vehicle to which some forms of the present disclosure are applicable.

FIG. 1 is a diagram showing an example of the configuration of a powertrain of a vehicle to which forms of the present disclosure are applicable and illustrates the structure of a powertrain of a hybrid vehicle.

FIG. 1 illustrates a powertrain of a hybrid vehicle employing a parallel type hybrid system including an electric motor (or a driving motor) 140 and an engine clutch (EC) 130 that are installed between an internal combustion engine (ICE) 110 and a transmission 150.

In such a vehicle, in general, when a driver presses an accelerator after starting the vehicle, the driving motor 140 is driven using power of a battery while the engine clutch 130 is open and transmits power to move wheels through the transmission 150 and a final drive (FD) 160 (i.e., EV mode). As the vehicle gradually accelerates, high traction force is further required, in which case a starter generator motor 120 may be operated to drive the engine 110.

Accordingly, when the rotational speeds of the engine 110 and the motor 140 are the same, the engine clutch 130 is then engaged such that both the engine 110 and the motor 140 drive the vehicle (i.e., transition to an HEV mode from an EV mode). When a predetermined engine off condition, such as vehicle deceleration, is satisfied, the engine clutch 130 is opened and the engine 110 stops (i.e., transition to an EV mode from an HEV mode). In addition, the hybrid vehicle converts traction force of a wheel into electric energy to recharge the battery, which is referred to as braking energy regeneration or regenerative braking.

The starter generator motor 120 functions as a starter motor when the engine is turned on and functions as a generator after the engine is turned on or when rotational energy is recovered during engine off, and thus, the starter generator motor 120 may also be referred to as a hybrid starter generator (HSG), and as necessary, may be referred to as an auxiliary motor.

Figure 2:
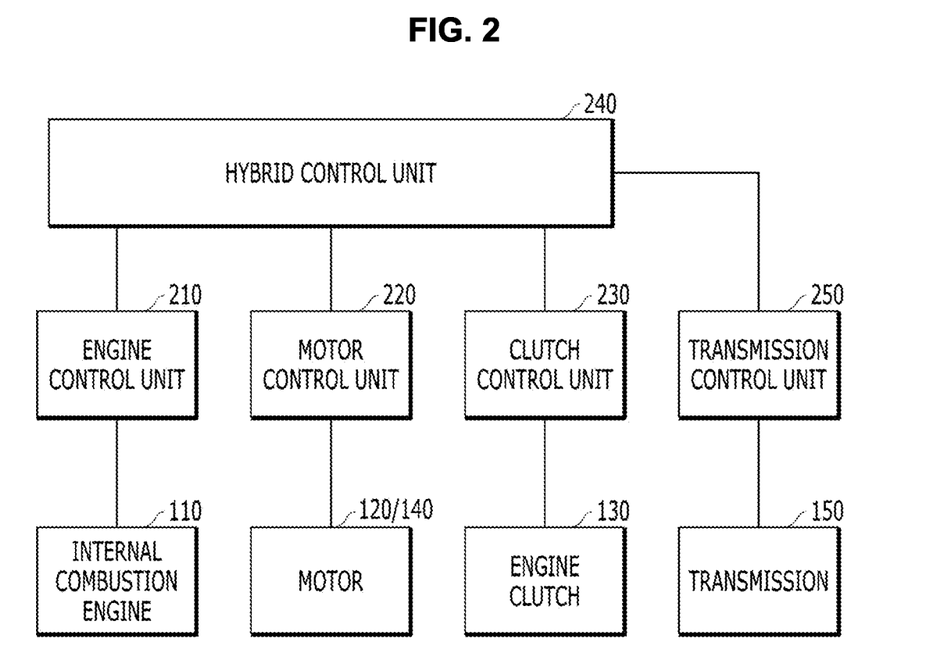
FIG. 2 is a block diagram showing an example of a control system of a hybrid vehicle to which some forms of the present disclosure are applicable.

A relationship among controllers of a vehicle including such a powertrain is shown in FIG. 2.

FIG. 2 is a block diagram showing an example of a control system of a hybrid vehicle to which exemplary forms of the present disclosure are applicable.

Referring to FIG. 2, in the hybrid vehicle, the internal combustion engine 110 may be controlled by an engine controller 210, the torque of the starter generator motor 120 and the driving motor 140 may be controlled by a motor control unit (MCU) 220, and the engine clutch 130 may be controlled by a clutch controller 230. Here, the engine controller 210 may also be referred to as an engine management system (EMS). In addition, the transmission 150 may be controlled by a transmission controller 250. In one form, a controller for the starter generator motor 120 and a controller for the driving motor 140 may also be separately configured.

Each controller may be connected to a hybrid control unit (HCU) 240 for controlling an overall mode-switching procedure as a high-level controller and may provide, to the HCU 240, information desired to switch driving modes and to control an engine clutch during gear shifting, and/or information desired to control engine off, or may perform an operation according to a control signal under the control of the HCU 240.

In more detail, the HCU 240 may determine whether modes are switched depending on a driving state of a vehicle. For example, the HCU 240 may determine an open time of the engine clutch (EC) 130 and may control hydraulic pressure (in the case of a wet EC) or control torque capacity (in the case of a dry EC) when the EC is open. The HCU 240 may determine an EC state (lock-up, slip, open, etc.) and may control a time for stoppage of fuel injection of the engine 110. The HCU 240 may transmit a torque command for controlling torque of the starter generator motor 120 to the MCU 220 to control engine off and may control engine rotational energy recovery. In addition, the HCU 240 may determine a mode switching condition during control of driving mode switching and may control a low-level controller for mode switching.

Needless to say, it will be obvious to one of ordinary skill in the art that the aforementioned relationship between the controllers and functions/divisions of the controllers are exemplary, and thus, the present disclosure is not limited thereto. For example, the HCU 240 may be embodied by allowing any one of controllers other than the HCU 240 to provide a corresponding function, or two or more other controllers may provide the corresponding function in a distributed manner. The controller(s) may be implemented by at least one processor operated by a setting program, in which the setting program includes a series of commands for performing a specified function and/or a control according to the present disclosure to be described below.

Although the above configuration of the powertrain has been described in terms of a hybrid vehicle, it would be obvious to one of ordinary skill in the art that the present disclosure is applicable irrespective of the configuration of the powertrain. However, forms of the present disclosure may also be applied to a general internal combustion engine as well as an electrified vehicle such as an electric vehicle (EV) and a fuel cell electric vehicle (FCEV).

Figure 3:
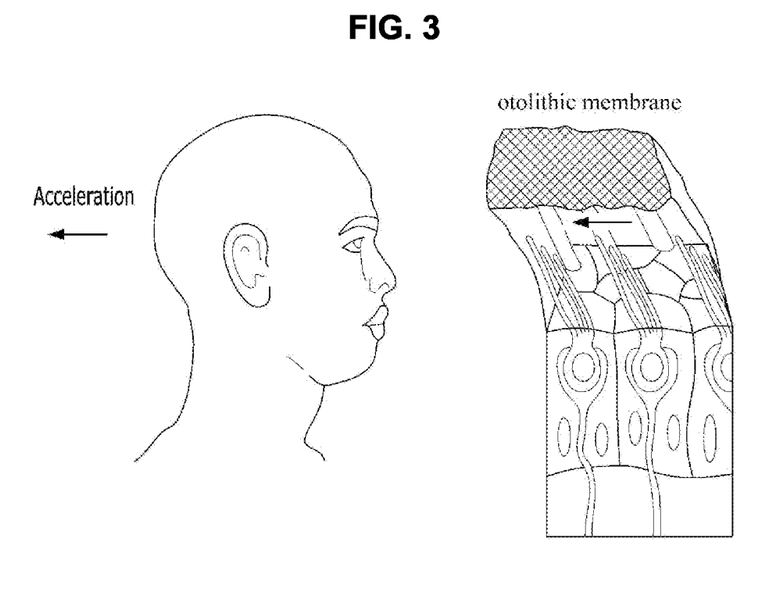
FIGS. 3 and 4 are diagrams for explaining a neural transfer function of the otolith.
Figure 4:
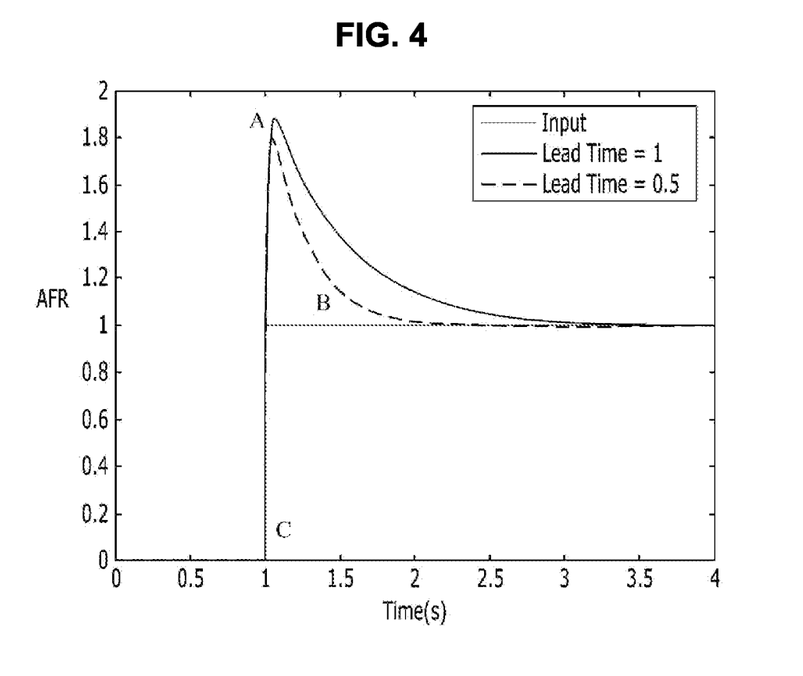

FIGS. 3 and 4 are diagrams for explaining a neural transfer function of the otolith applied to one form of the present disclosure. The neural transfer function of the otolith is based on content disclosed in "Robert J. Telban and Frank M. Cardullo. Motion cueing algorithm development: Human-centered linear and nonlinear approaches. Technical report, State University of New York, 2005" that is a technical report on a neural response of otoliths.

FIG. 3 illustrates displacement resulting from an otolithic membrane due to forward linear acceleration. Referring to FIG. 3, a direction of an arrow indicates a direction of force applied to the head. When acceleration is linearly applied in a forward direction, force may be applied from a front surface of the head to a rear surface thereof, and neurons of the otolithic membrane may also move in the same direction as the force applied to the head. The movement of the otolith is transferred to the brain to allow the human body to perceive acceleration. As such, a signal response to the force applied to the otolith may be represented using a transfer function shown in Equation 1 below.

$$\frac{AFR}{F} = \frac{33.3(10s + 1)}{(5s + 1) \cdot (0.016s + 1)} \quad \text{[Equation 1]}$$

Here, AFR is Afferent firing rate,

Equation 1 represents a neural transfer function of the otolith and is a function derived for quantitatively calculating a relationship between force F and an afferent firing rate (AFR) using time s and constants derived through experimentation. A detailed derivation process of Equation 1 is disclosed in "Robert J. Telban and Frank M. Cardullo. Motion cueing algorithm development: Human-centered linear and nonlinear approaches. Technical report, State University of New York, 2005" that is a technical report, and thus a detailed description thereof will be omitted.

FIG. 4 is a graph showing human acceleration cognitive characteristics through response analysis of a neural transfer function of otolith.

Referring to FIG. 4, a horizontal axis indicates time s and a vertical axis indicates an afferent firing rate (AFR). A plot using a lead time coefficient of 1 and a plot using a lead time coefficient of 0.5 may be derived when arbitrary constants 1 and 0.5 determined according to an experiment result in which the AFR is changed depending on a frequency are inserted.

As seen from region A of the graph, an initial nervous response to movement of the otolith is larger than in other unit inputs. Then, as the input time elapses, a neural response gradually decreases. Thus, it may be seen that the human body sensitively responds to change in acceleration (jerks).

As seen from region B, a plot using a lead time coefficient of 1 and a plot using a lead time coefficient of 0.5 may have different durations of neural response. That is, it may be determined that there are specific frequency characteristics for recognizing acceleration. A neural transfer function of the otolith to which a lead time coefficient is applied depending on a driving mode such as a sport mode, a normal mode, and an eco-friendly mode may be applied based on the fact that there are different durations of neural response depending on lead time coefficients.

As seen from region C, the nerve immediately responds to force applied to the otolith without delay. That is, since there is no delay in recognizing the acceleration feeling, it may be seen that immediate acceleration is desired for a desired torque.

When an acceleration profile is generated based on the aforementioned neural transfer function of the otolith, an acceleration profile that is the closest to the driver's intention to accelerate a vehicle may be generated. In addition, when a lead time coefficient is changed, the magnitude and persistency of initial nervous response are changed, and thus a torque generation slope may be adjusted based on a lead time coefficient. Accordingly, an acceleration profile may be generated to allow the driver to experience differentiated acceleration feeling for each driving mode by adjusting a lead time coefficient depending on a driving mode.

When input force is inserted into the neural transfer function of the otolith, an afferent firing rate (AFR) of the human with respect to the corresponding force may be calculated. Thus, when an inverse function of the neural transfer function of the otolith is used, the input force input depending on the AFR may be calculated. That is, force desired to acquire a desired sense may be quantified. The acceleration feeling that the driver experiences may be considered as the AFR and the force may be considered as torque. Thus, torque for allowing the driver to experience the corresponding acceleration feeling may be calculated by inserting the acceleration feeling desired by the driver into the inverse function of the neural transfer function of the otolith. The acceleration feeling desired by the driver may be acquired from input of an accelerator pedal manipulated by the driver. Thus, according to one form of the present disclosure, the driver's pedal input may be assumed to be acceleration feeling desired by the driver, and the torque to be input may be calculated by inserting the acceleration feeling desired by the driver into the inverse function of the neural transfer function of the otolith.

When the neural transfer function of the otolith is applied to control of acceleration of the vehicle, acceleration feeling (Accel Feeling) may correspond to command torque of the driver, and force may correspond to command torque of a drivetrain. A relationship between the input force, that is, the command torque of the drivetrain and acceleration feeling (Accel Feeling), that is, the command torque of the driver may be represented using a transfer function shown in Equation 2 below.

$$\frac{Accel \text{ Feeling}}{Force} = \frac{(10s + 1)}{(5s + 1) \cdot (0.016s + 1)} \quad \text{[Equation 2]}$$

Equation 2 is a transfer function for calculating acceleration feeling (Accel Feeling) depending on input force. Thus, in order to calculate force, pthat is, torque desired to acquire the acceleration feeling (Accel Feeling), the inverse function of Equation 2 may be used. However, when the inverse function of Equation 2 is used, a degree of the numerator is greater than that of the denominator, and thus it is not appropriate to apply the inverse function as torque of the vehicle. Accordingly, the following transfer function may be derived by additionally applying a low pass filter to the inverse function of Equation 2.

$$\frac{Force}{Accel \text{ Filling}} = \frac{(5s + 1) \cdot (0.016s + 1)}{(10s + 1)} \frac{\omega_{lf}}{(s + \omega_{lf})} \quad \text{[Equation 3]}$$

According to Equation 3, torque (Force) required to acquire the required acceleration feeling (Accel Feeling) may be calculated. Here, the acceleration feeling desired by the driver may be assumed to be pedal input of the driver. Thus, when the torque calculated using the accelerator pedal input of the driver is assumed to be the acceleration feeling desired by the driver and the torque calculated using the pedal input is applied to the function of Equation 3 and the filter, the lastly required target torque may be calculated.

Figure 5:
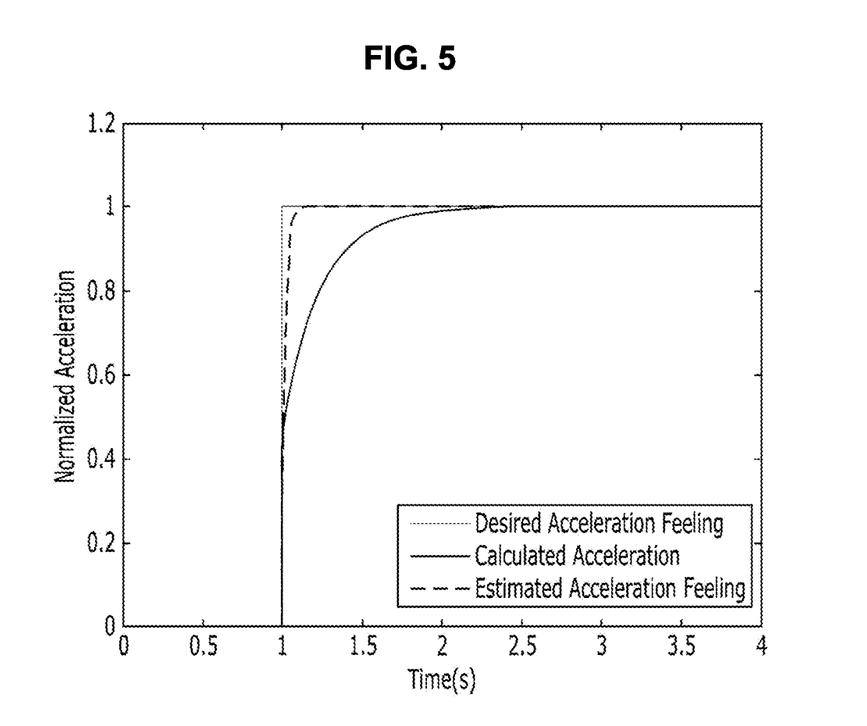
FIG. 5 is a graph for explaining Normalized Acceleration according to an exemplary form of the present disclosure.

FIG. 5 is a graph for explaining Normalized Acceleration according to another form of the present disclosure.

Referring to FIG. 5, when manipulating an accelerator pedal, a driver may want to accelerate a vehicle without delay. Desired Acceleration Feeling, which is desired by the driver, may have a pattern in which the Desired Acceleration Feeling rises vertically to reach a predetermined value and is then maintained.

Torque may be calculated based on the accelerator pedal input of the driver. Here, the acceleration feeling of the driver may not be considered when the torque is calculated, and accordingly, the acceleration feeling with respect to the calculated torque (Calculated Acceleration) may be different from the acceleration feeling desired by the driver (Desired Acceleration Feeling).

Accordingly, the present disclosure may apply the result value obtained by inserting the torque calculated based on the input of the accelerator pedal into the inverse function of the neural transfer function of the otolith and then filtering the same. Estimated acceleration feeling of torque (Estimated Acceleration Feeling) by applying the inverse function of the neural transfer function of the otolith may have a pattern close to the acceleration feeling desired by the driver (Desired Acceleration Feeling).

Figure 6:
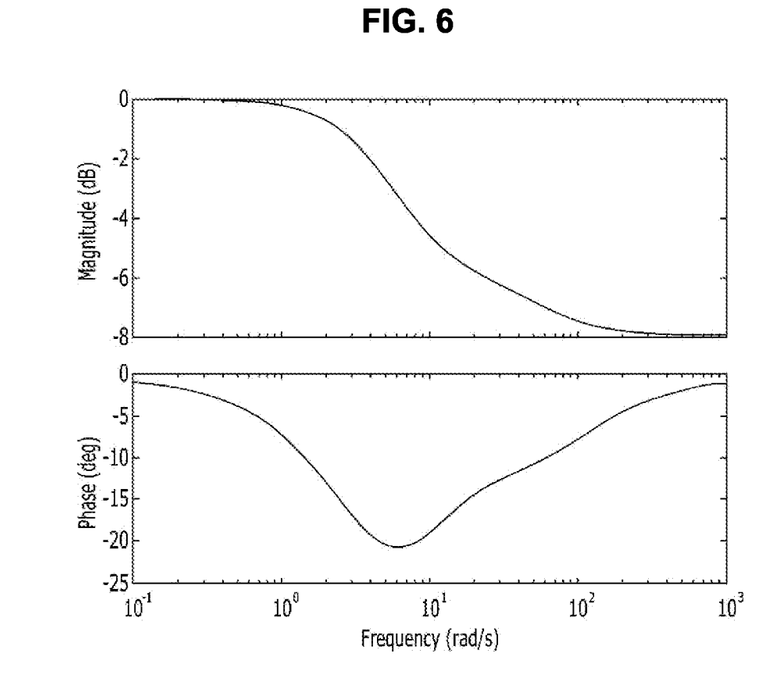
FIG. 6 is a graph for explaining a filtered frequency according to another form of the present disclosure.

FIG. 6 is a graph of response characteristics (frequency response) of a generated acceleration profile according to another form of the present disclosure.

Referring to FIG. 6, a filter for generating an acceleration profile by applying an inverse function of a neural transfer function of the otolith according to another form of the present disclosure may be configured in the form of a band pass filter for partially passing 10 Hz or greater while being a 6 Hz low pass filter. The filter for generating the acceleration profile may be designed to filter a value that is too large to be used as torque among values calculated using the inverse function of the neural transfer function of the otolith and to then filter a band that causes shock in a drivetrain.

Figure 7:
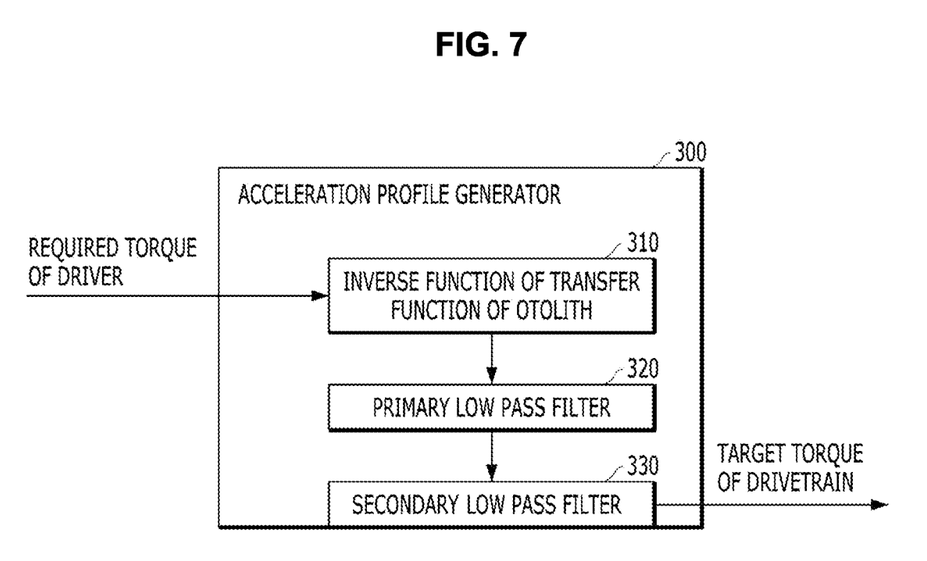
FIG. 7 is a diagram showing the configuration of an acceleration profile generator according to an exemplary form of the present disclosure.

FIG. 7 is a diagram showing the configuration of an acceleration profile generator according to one form of the present disclosure. According to the present disclosure, signal output of the human vestibular system is assumed to have similar response to the acceleration feeling that a person experiences, and the neural transfer function of the otolith of the vestibular system may be applied to generate the acceleration profile. However, it may be possible to use the signal output characteristics of organs related to recognition of acceleration feeling other than the otolith.

The method of generating the acceleration profile may be performed using a calculation function of the hybrid control unit (HCU) 240 without a separate sensor or structure change. In the following description, although the configuration of an acceleration profile generator 300 will be described, each block is used for a functional description, and in reality, the acceleration profile generator 300 may be configured in the form of software for executing an algorithm for calculation.

Referring to FIG. 7, the acceleration profile generator 300 may include an inverse function 310 of a neural transfer function of the otolith, a primary low pass filter 320, and a secondary low pass filter 330.

The inverse function 310 of the neural transfer function of the otolith may calculate torque by receiving the required torque of the driver and inserting the same into the inverse function of the neural transfer function of the otolith. That is, the required torque may be calculated by inputting the required torque of the driver, that is, the desired acceleration feeling to the inverse function of vestibular system using force as input and acceleration feeling as output. Here, a torque generation slope may be adjusted depending on a lead time coefficient applied to the inverse function of the neural transfer function of the otolith. Accordingly, torque may be generated to allow the driver to experience differentiated acceleration feeling for each driving mode by adjusting a lead time coefficient depending on a driving mode.

The primary low pass filter 320 may generate a secondary torque value by filtering output of the inverse function of the neural transfer function of the otolith. A simple inverse function of the vestibular system has a degree of the numerator greater than the denominator, and thus is designed as an unstable filter. To overcome this, torque in a valid range may be acquired by filtering output of the simple inverse function by the primary low pass filter 320.

The secondary low pass filter 330 may filter the secondary torque value again to reduce shock of a drivetrain. The secondary low pass filter 330 may reduce the drivetrain torque to be generated for providing fast responsiveness when the inverse function 310 of the neural transfer function of the otolith is applied. The torque to which the secondary low pass filter 330 is applied may be transferred as target torque of the drivetrain.

Figure 8:
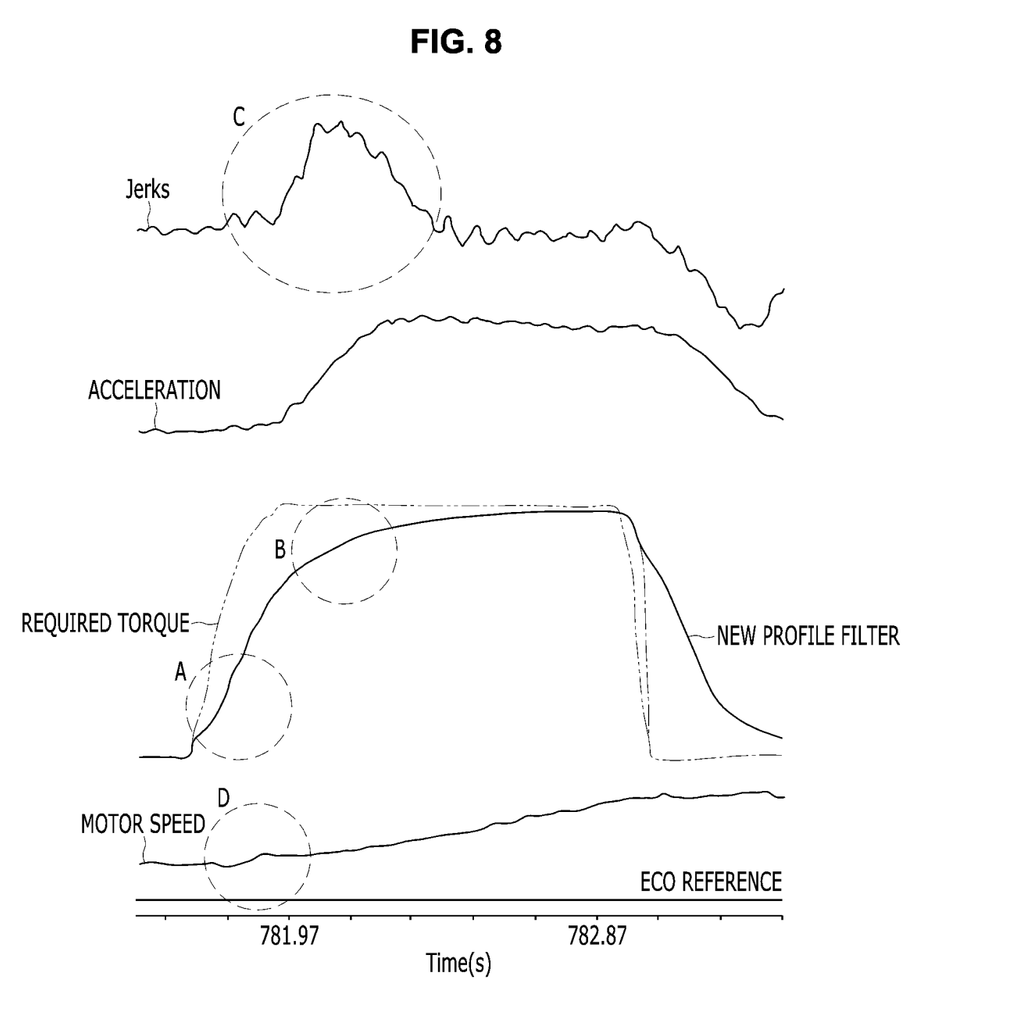
FIGS. 8 and 9 are graphs for explaining an effect when the present disclosure is applied while driving a vehicle.
Figure 9:
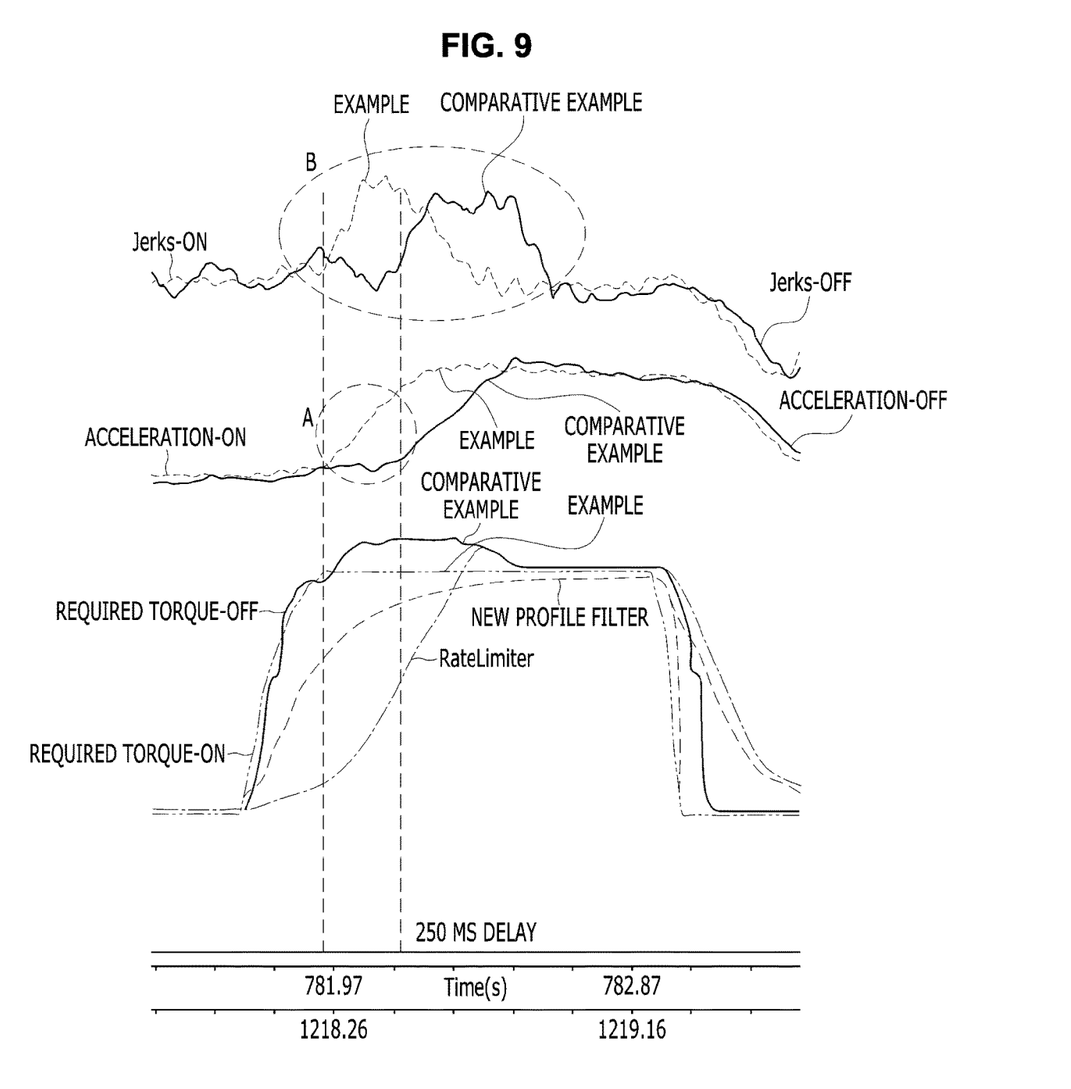

FIGS. 8 and 9 are graphs for explaining an effect when the present disclosure is applied while driving a vehicle.

FIG. 8 is a graph showing required torque, change in motor speed, jerks, and change in acceleration when a new profile filter according to another form of the present disclosure is applied while driving the vehicle in an eco-friendly mode.

Referring to region A, immediate acceleration feeling may be caused and responsiveness may be improved by rapidly generating jerks with respect to early acceleration input.

Referring to region B, the characteristics of a band pass filter are applied to the new profile filter after mid-term acceleration input, and thus torque may converge on the required torque while being restrictedly increased.

As seen from region C, due to regions A and B, jerks that sensitively respond may have different forms in early/late terms. Torque may converge on the required torque by generating jerks to cause immediate acceleration feeling with respect to early acceleration input and reducing jerks with respect to late acceleration input. Accordingly, as seen from the experiment, fast responsiveness may affect improvement in the acceleration feeling of the driver and may reduce movement of the head of an occupant.

As seen from region D, despite early sudden acceleration, shock in a drivetrain may be controlled at the same level as a level intended when vehicles are mass-produced. Here, it may also be possible to apply a method of improving the stability of DTP and an acceleration feeling dedicated rate limiter.

When the new profile filter according to one form of the present disclosure is applied, a plurality of drivers expresses opinions for improving acceleration feeling and that acceleration feeling is differentiated simply by adjusting one lead factor, e.g., a lead time.

FIG. 9 is a graph showing required torque, jerks, and change in acceleration according to Comparative Example using a conventional rate limiter filter and Example using a new profile filter according to the present disclosure.

As seen from region A, according to Example of the present disclosure, torque may be more rapidly generated by about 250 ms than in Comparative Example. Referring to a pattern of jerks, according to Example of the present disclosure, jerks may be generated earlier than Comparative Example. Accordingly, responsiveness may be improved during early acceleration. Referring to a pattern of acceleration, acceleration may have the same amount and the same slope in Comparative Example and Example according to the present disclosure. Accordingly, a driver may feel as if the vehicle is accelerated at the speed required by the driver.

As seen from region B, patterns of jerks may be different from each other in Comparative Example and Example according to the present disclosure. A difference therebetween is summarized as follows.

|  | Prior Art | Proposed Art |
|---|---|---|
| Early acceleration | Jerks are generated late | Jerks are generated early |
| Mid-term acceleration | Jerks are maintained | Jerks begin to decrease |
| Last acceleration | Jerks decreases fast | Jerks decreases slowly |
| Remark | Rate limiter | Band pass filter |

As seen from comparison shown in the above Table, according to the proposed art of Example of the present disclosure, recognition of a person who is sensitive to early response may be satisfied by generating fast jerks during early acceleration.

In mid-term acceleration, conventionally, jerks are maintained, but according to the present disclosure, jerks may begin to decrease and acceleration may be smoothly controlled.

In late acceleration, conventionally, jerks are rapidly reduced, but according to the present disclosure, jerks may be controlled to satisfy feeling of the driver by being slowly reduced.

As a result, conventionally, the acceleration profile is generated using a rate limiter method, but according to the present disclosure, the acceleration profile may be generated using a band pass filter.

Figure 10:
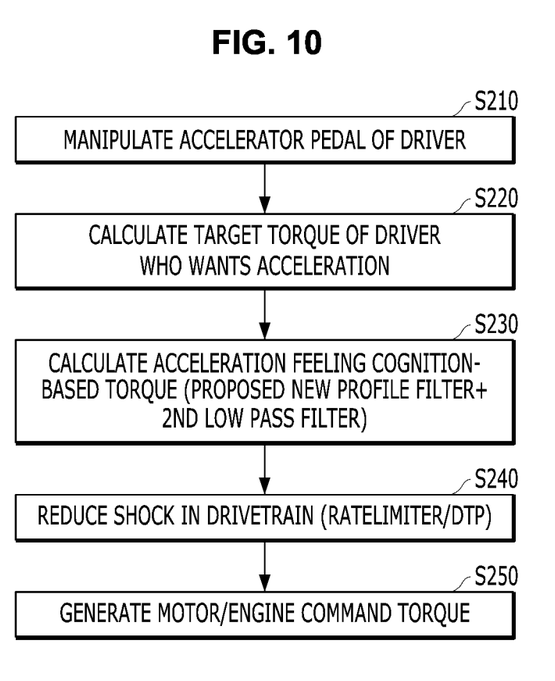
FIG. 10 is a flowchart of a method of controlling a vehicle according to another form of the present disclosure.

FIG. 10 is a flowchart of a method of controlling a vehicle according to another form of the present disclosure. The method of generating the acceleration profile may be performed using a calculation function of a control device for controlling an overall function of a vehicle without a separate sensor or structure change.

Referring to FIG. 10, when the driver intends to accelerate the vehicle, the driver may manipulate an accelerator pedal at a similar level to the intention to accelerate the vehicle (S210).

Target torque, that is, a first torque value of the driver who wants acceleration may be calculated depending on a manipulation amount of an accelerator pedal (S220).

Acceleration feeling cognition-based torque may be calculated by inserting a first torque value calculated depending on a manipulation amount of an accelerator pedal into a function that receives acceleration feeling as input and converts the received acceleration feeling into output, a second torque value may be calculated by applying a primary low pass filter for providing stability to the torque calculated by applying the function, and a target torque value may be calculated by applying a secondary low pass filter for reducing shock in a drivetrain to the second torque value (S230).

A rate limiter, DTP, etc. may be further applied to the target torque value in order to reduce shock in the drivetrain (S240).

Command torque to be output to an engine, a motor, or both sides thereof may be generated based on the finally calculated torque (S250).

As described above, a vehicle related to at least one form of the present disclosure may provide an acceleration profile generator for generating a torque profile of a powertrain controller based on the acceleration cognitive characteristics of a driver. According to another form of the present disclosure, in order to quantify the acceleration cognitive characteristics of the driver, an inverse function of a neural transfer function of the otolith may be introduced, and a primary low-pass filter may be additionally used in order to overcome a problem in terms of the stability of torque and noise of an output value when input is inserted into a function. According to another form of the present disclosure, an acceleration profile may be generated depending on a drive mode by adjusting a lead time coefficient of the neural transfer function of the otolith to adjust a torque generation slope. As such, the acceleration profile may be designed in the form of a filter based on human perception, and thus it may be possible to differentiate acceleration feeling for each driving mode through a minimum number of parameters.

The vehicle related to at least one form of the present disclosure as configured above may generate an acceleration profile based on the characteristics of acceleration feeling perceived by a person by quantifying acceleration feeling for recognizing acceleration using a transfer function of the human response to force applied to the otolith of the human vestibular system.

In particular, driver's satisfaction with driving performance may be improved by generating an acceleration profile to experience acceleration feeling corresponding to intention to accelerate a vehicle.

It will be appreciated by persons skilled in the art that that the effects that could be achieved with the present disclosure are not limited to what has been particularly described hereinabove and other advantages of the present disclosure will be more clearly understood from the detailed description.

The present disclosure can also be embodied as computer readable code on a computer readable recording medium. The computer readable recording medium is any data storage device that can store data which can thereafter be read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy disks, and optical data storage devices.

The above exemplary forms are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. A method of controlling a vehicle, the method comprising:
receiving a manipulation amount of an accelerator pedal and calculating a first torque value;
converting the first torque value into an output value representative of an acceleration feeling;

generating a second torque value by applying a first filter to the converted output value;
generating a target torque value by applying a second filter to the second torque value; and
generating a torque command based on the target torque value.

2. The method of claim 1, further comprising: receiving a force and outputting an afferent firing rate (AFR) using a transfer function of a vestibular system of a human body.

3. The method of claim 2, wherein the transfer function of the vestibular system includes a neural transfer function of an otolith, and the neural transfer function receives the acceleration feeling or a command torque of a driver and outputs a command torque of a drivetrain using a following Equation 1:

$$\frac{Accel\ Feeling}{Force} = \frac{(10s+1)}{(5s+1)\cdot(0.016s+1)} \quad \text{[Equation 1]}$$

where:
Accel Feeling is the acceleration feeling,
Force is the command torque of the drivetrain, and
s is a time.

4. The method of claim 3, wherein the generating the second torque value includes generating the second torque value using a following Equation 2 for low-pass filtering a result obtained by inserting the first torque value into an inverse function of the neural transfer function of the otolith:

$$\frac{Force}{Accel\ Filling} = \frac{(5s+1)\cdot(0.016s+1)}{(10s+1)} \frac{\omega_{lf}}{(s+\omega_{lf})} \quad \text{[Equation 2]}$$

where, $\omega_{lf}$ is low pass filter.

5. The method of claim 4, wherein a coefficient inserted into the inverse function of the neural transfer function is changed based on a driving mode including at least one of a sport mode, a normal mode, or an eco-friendly mode.

6. The method of claim 1, wherein the first filter includes a primary low pass filter configured to pass a low pass signal of the converted output value.

7. The method of claim 1, wherein the second filter includes a secondary low pass filter configured to pass a low pass signal of the second torque value.

8. The method of claim 1, wherein:
the target torque value has a profile in which relatively fast jerks are generated during early acceleration,
the jerks gradually decreases during mid-term acceleration, and
the jerks relatively slowly decreases during late acceleration.

9. The method of claim 1, wherein generating the torque command based on the target torque value includes generating a torque command for controlling at least one of an engine or a motor based on the target torque value.

10. A non-transitory computer-readable recording medium having a program recorded thereon, the program to direct a processor to perform acts of:
receiving a manipulation amount of an accelerator pedal and calculating a first torque value;
converting the first torque value into an output value representative of an acceleration feeling;
generating a second torque value by applying a first filter to the converted output value;
generating a target torque value by applying a second filter to the second torque value; and
generating a torque command based on the target torque value.

11. A vehicle comprising:
a controller configured to receive a manipulation amount of an accelerator pedal and output a torque command based on a target torque value; and
an acceleration profile generator configured to:
calculate a first torque value based on the manipulation amount of the accelerator pedal,
convert the first torque value into an output value representative of an acceleration feeling,
generate a second torque value by applying a first filter to the converted output value, and
generate the target torque value by applying a second filter to the second torque value, the second filter configured to stabilize the second torque value.

12. The vehicle of claim 11, wherein the acceleration profile generator is configured to perform a transfer function of a vestibular system of a human body, and the transfer function is configured to receive a force and output an afferent firing rate (AFR).

13. The vehicle of claim 12, wherein the transfer function includes a neural transfer function of an otolith, and the neural transfer function is configured to receive the acceleration feeling or a command torque of a driver and output a command torque of a drivetrain using a following Equation 1:

$$\frac{Accel\ Feeling}{Force} = \frac{(10s+1)}{(5s+1)\cdot(0.016s+1)} \quad \text{[Equation 1]}$$

where:
Accel Feeling is the acceleration feeling,
Force is the command torque of the drivetrain, and
s is a time.

14. The vehicle of claim 13, wherein the acceleration profile generator is further configured to generate the second torque value using a following Equation 2 for low-pass filtering a result obtained by inserting the first torque value into an inverse function of the neural transfer function of the otolith:

$$\frac{Force}{Accel\ Filling} = \frac{(5s+1)(0.016s+1)}{(10s+1)} \frac{\omega_{lf}}{(s+\omega_{lf})} \quad \text{[Equation 2]}$$

where, $\omega_{lf}$ is low pass filter.

15. The vehicle of claim 14, wherein a coefficient inserted into the inverse function of the neural transfer function of the otolith is changed based on a driving mode, and the driving mode includes at least one of a sport mode, a normal mode, or an eco-friendly mode.

16. The vehicle of claim 11, wherein the first filter includes a primary low pass filter configured to pass a low pass signal of the converted output value.

17. The vehicle of claim 11, wherein the second filter includes a secondary low pass filter configured to pass a low pass signal of the second torque value.

18. The vehicle of claim 11, wherein:
the acceleration profile generator is configured to generate a torque profile in which relatively fast jerks are generated during early acceleration, the jerks gradually decreases during mid-term acceleration, and the jerks relatively slowly decreases during late acceleration.

19. The vehicle of claim 11, wherein the controller is configured to generate a torque command to at least one of an engine or a motor based on the target torque value.

* * * * *